United States Patent
Li et al.

(10) Patent No.: US 8,326,159 B2
(45) Date of Patent: Dec. 4, 2012

(54) ELECTRONIC COMPENSATION OF IMPAIRMENTS USING WAVELET FILTERS FOR BACKWARD PROPAGATION

(75) Inventors: Guifang Li, Oviedo, FL (US); Gilad Goldfarb, San Jose, CA (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 419 days.

(21) Appl. No.: 12/727,532

(22) Filed: Mar. 19, 2010

(65) Prior Publication Data

US 2010/0239261 A1  Sep. 23, 2010

Related U.S. Application Data

(60) Provisional application No. 61/162,086, filed on Mar. 20, 2009.

(51) Int. Cl.
*H04B 10/06* (2006.01)

(52) U.S. Cl. ........................................ 398/208; 398/211

(58) Field of Classification Search .................. 398/208, 398/211
See application file for complete search history.

(56) References Cited

U.S. PATENT DOCUMENTS

| | | | |
|---|---|---|---|
| 2004/0197103 A1* | 10/2004 | Roberts et al. | 398/159 |
| 2009/0214215 A1* | 8/2009 | Li et al. | 398/81 |
| 2009/0245809 A1* | 10/2009 | Nakamoto | 398/159 |
| 2010/0239254 A1* | 9/2010 | Li et al. | 398/65 |
| 2010/0239262 A1* | 9/2010 | Li et al. | 398/81 |
| 2010/0322637 A1* | 12/2010 | Hayee et al. | 398/158 |

* cited by examiner

*Primary Examiner* — Nathan Curs
(74) *Attorney, Agent, or Firm* — Thomas|Horstemeyer, LLP

(57) ABSTRACT

Systems and methods of compensating for transmission impairment over an optical transmission channel are disclosed. The optical transmission channel includes an optical fiber and an optical amplifier. One such method includes: receiving an optical signal which has been distorted in the physical domain by an optical transmission channel; and solving a non-linear Schrödinger equation (NLSE) using a split-step Fourier Method (SSFM). The NLSE describes a virtual optical fiber corresponding to the optical fiber. The SSFM implements a linear operator with a wavelet-based FIR filter.

20 Claims, 6 Drawing Sheets

ELECTRONIC COMPENSATION OF IMPAIRMENTS USING WAVELET FILTERS FOR BACKWARD PROPAGATION

CROSS-REFERENCE TO RELATED APPLICATIONS

This application claims priority to U.S. Provisional Application having Ser. No. 61/162,086 filed Mar. 20, 2009, which is hereby incorporated by reference herein in its entirety.

FIELD OF THE DISCLOSURE

The present disclosure relates to compensating for optical transmission impairments in the electronic or software domain.

BACKGROUND

Channel impairments in transmission systems result in signal degradation and thus limit the carrying capacity of these systems. In optical transmission systems, some of these impairments are linear (e.g., fiber chromatic dispersion or CD) and some are non-linear (e.g., cross-phase modulation and four-wave mixing caused by the Kerr effect). To minimize the effect of impairments, transmission systems may include various types of compensation systems or devices. A signal can be modified before, or as part of, transmission to account for the effect of impairment (a technique known as pre-compensation). Conversely, knowledge about an impairment can be used to modify a received signal to compensate for the impairment (a technique known as post-compensation). Such compensation systems or devices can be implemented in the optical domain or in the electrical/electronic domain.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

The inventive techniques described herein compensate for optical distortion, using backward propagation in the electrical domain. Specifically, the receiver uses digital backward propagation to convert the received optical signal into an estimate of the transmitted signal. This digital backward propagation process involves solving one or more equations which model a virtual optical transmission channel corresponding to the physical optical transmission channel. The model uses channel parameter values that are opposite to ("backward" from) to the physical channel parameters. Applying the model to the received optical signal thus compensates for impairments produced by the physical channel.

Figure 1:
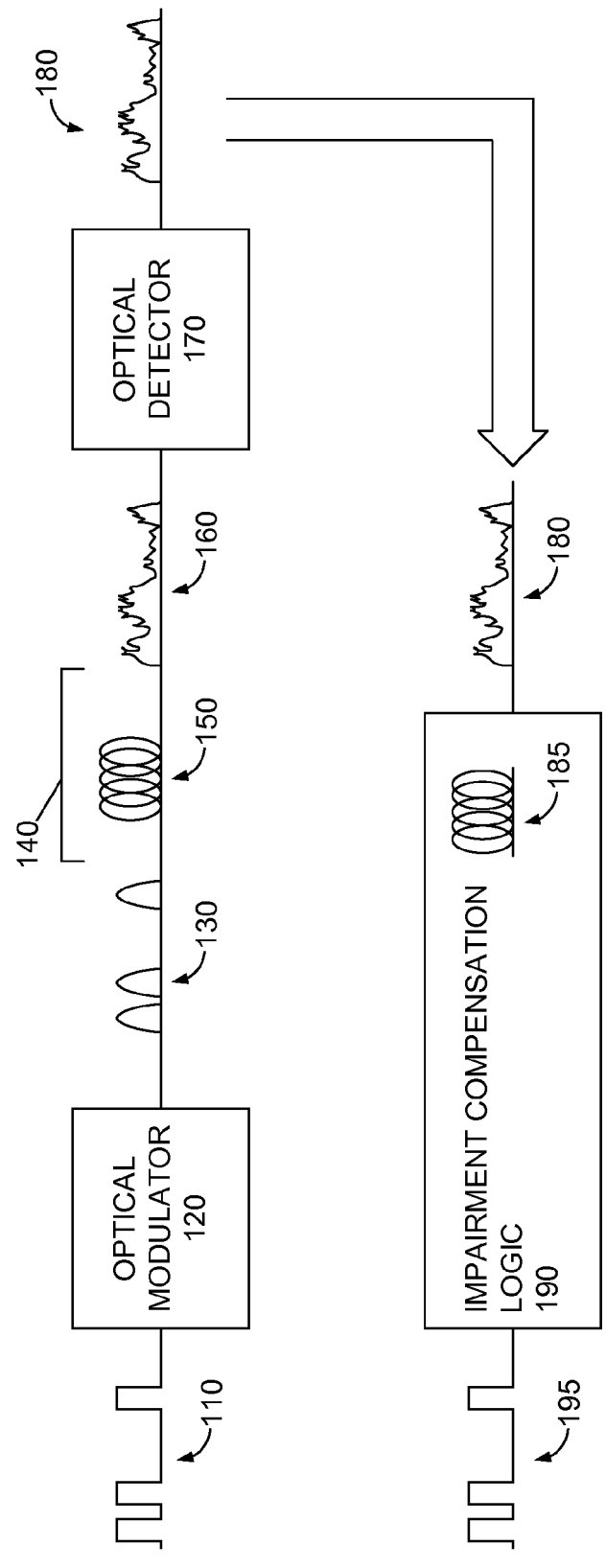
FIG. 1 is a system model diagram of an optical communication system including impairment compensation logic, according to some embodiments.

FIG. 1 is a system model diagram of an optical communication system including an embodiment of impairment compensation logic. Transmitted data is carried by an electrical signal 110, which is provided to an optical modulator 120. Optical modulator 120 produces a (modulated) optical signal 130. Although FIG. 1 depicts only a single modulator, it should be appreciated that the principles described herein can be extended to various multiplexing schemes, such as wavelength-division multiplexing and/or polarization-division multiplexing.

Optical signal 130 travels through an optical channel 140, which includes optical fiber 150. Optical fiber 150 introduces various types of distortion, resulting in a distorted optical signal 160. Distorted optical signal 160 is provided to an optical detector 170, which converts the distorted optical signal to a signal in the electrical domain. Distorted electrical signal 180 is processed in the electrical (digital) domain by impairment compensation logic 190 to remove the distortion produced in the optical (physical) domain. Impairment compensation logic 190 operates by modeling the characteristics of optical fiber 150 in a virtual optical fiber 185. The output of impairment compensation logic 190 is a compensated electrical signal 195. Carried within compensated electrical signal 195 is data which is a replica (or near replica) of the originally transmitted data.

The model embodied in impairment compensation logic 190 accounts for, and reverses the effect of, various impairments introduced by optical fiber 150. Examples of such impairments include: fiber dispersion; self-phase modulation or SPM (an intra-channel impairment); cross-phase modulation or XPM (an inter-channel impairment); and four-wave mixing or FWM (another inter-channel impairment); Raman, Rayleigh and Brillouin scattering; and polarization impairments such as nonlinear polarization rotation. The techniques disclosed herein are particularly applicable to dispersive contributions to impairment, as will be discussed shortly.

Figure 2:
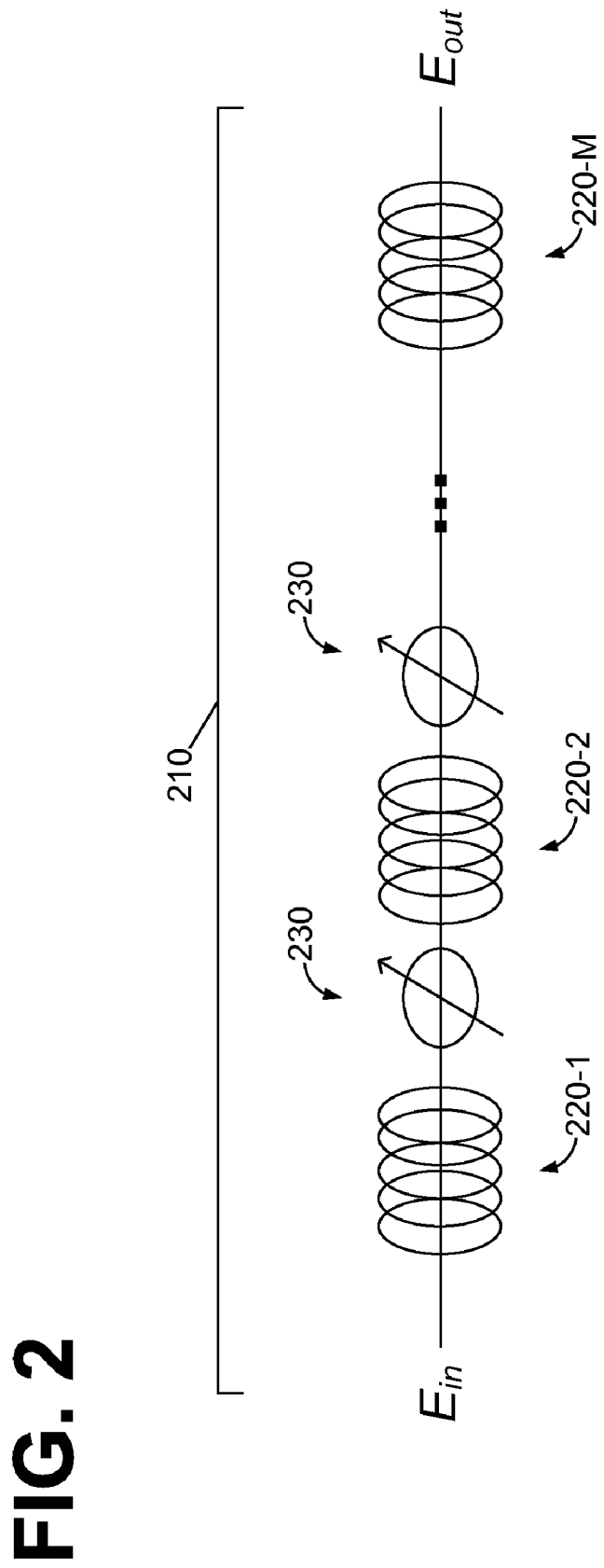
FIG. 2 is a system model diagram of a virtual fiber model used by the impairment compensation logic from FIG. 1, according to some embodiments.

FIG. 2 is a system model diagram of a virtual fiber model use by some embodiments of impairment compensation logic 190. $E_{in}$ is the electric field of the received distorted electrical signal (180 in FIG. 1). $E_{out}$ is the electric field of the compensated electrical signal (195 in FIG. 1). Virtual fiber link 210 includes multiple spans 220 (220-1, 220-2 . . . 220-M), divided by attenuators 230. (It should be appreciated that attenuators 230 compensate for optical amplifiers deployed between fiber spans).

Propagation of an optical field in a fiber span 220 is governed by a nonlinear Schrödinger equation (NLSE). The NLSE uses parameters which correspond to the characteristics of the physical optical fiber (150 in FIG. 1), including an absorption (loss) coefficient, a first-order chromatic dispersion parameter, a second-order chromatic dispersion parameter and a non-linear coefficient. The model compensates for physical fiber distortion by reversing the physical fiber parameters when solving the NLSE for each span, i.e., using parameter values that are the negative (opposite) of the actual fiber parameters. Since this is mathematically equivalent to reversing (negating) the sign of the spatial variable when solving the NLSE, the technique is known as "backward propagation".

The NLSE is given by $\partial_{-z}A(z,t)=(\hat{D}+\hat{N})A(z,t)$ (Eq. 1), where A(z,t) is the complex electrical field, $\hat{D}$ is the linear operator that accounts for (first order) fiber dispersion and loss, and $\hat{N}$ is the nonlinear operator that accounts for Kerr nonlinearity. The NLSE form discussed here is the generalized form, but the techniques described herein are applicable to, and or extendable to, other forms of NLSE such as total NLSE (T-NLSE), coupled NLSE (C-NLSE), enhanced coupled NLSE (EC-NLSE), and vectorial NLSE (V-NLSE).

The linear operator is given by $$\hat{D} = -j\frac{\beta_2}{2}\frac{\partial^2}{\partial t^2} + \frac{\beta^3}{6}\frac{\partial^3}{\partial t^3} - \frac{\alpha}{2}, \quad \text{(Eq. 2)}$$

where $\beta_2$ and $\alpha$ are the fiber dispersion and loss parameters, respectively. The nonlinear operator is given by $N=j\gamma|A|^2$, (Eq. 3), where $\gamma_{NL}$ is the fiber nonlinearity coefficient.

The dispersive and nonlinear contributions to impairment are considered to be independent within a relatively short propagation length. The backward propagation process is therefore decomposed into a series of iterations or steps. The embodiments of impairment compensation logic 190 described herein use the split-step Fourier method (SSFM) to solve the NLSE. The steps, which are specific to the equation, will be discussed in more detail later.

Figure 3:
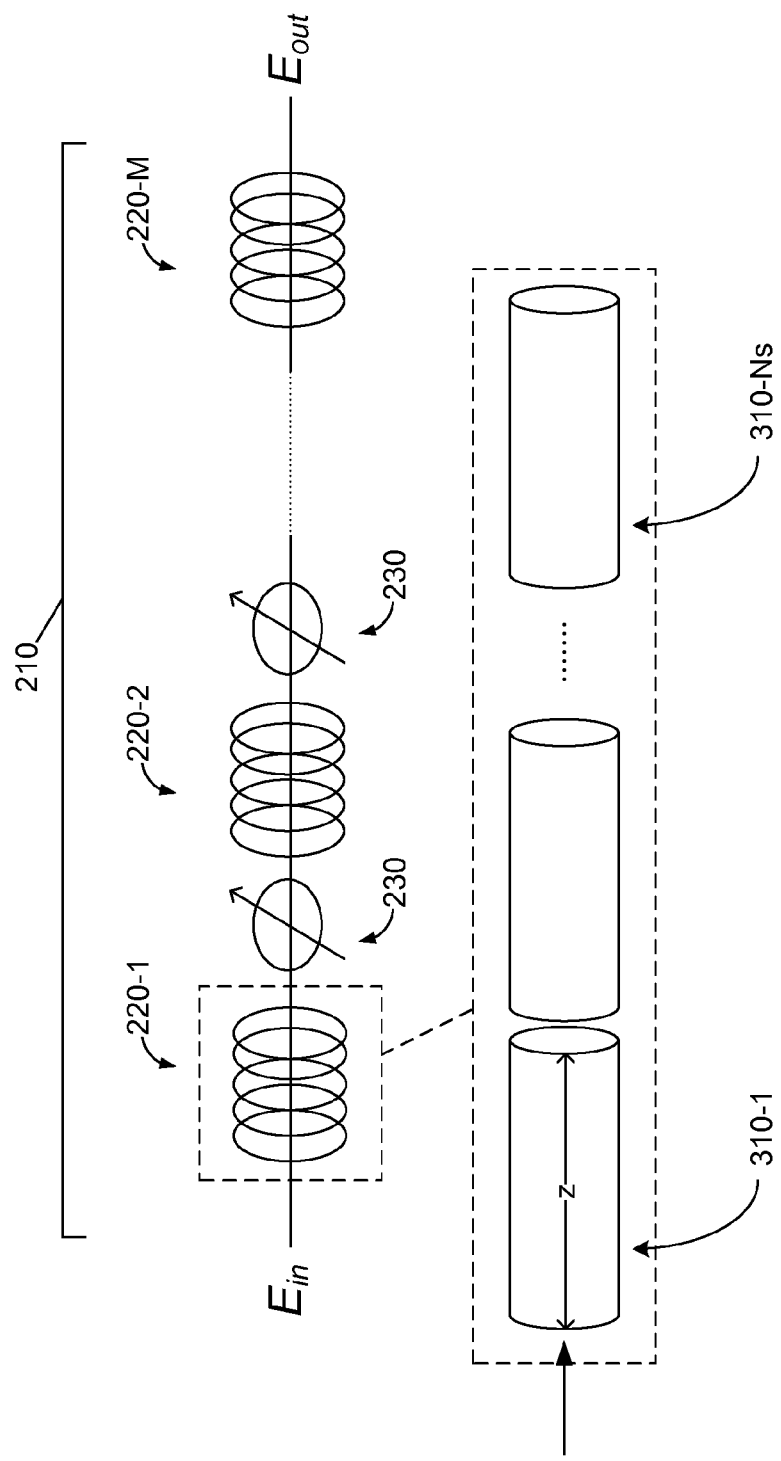
FIG. 3 is a block diagram of an SSFM as implemented by the impairment compensation logic from FIG. 1, according to some embodiments.

FIG. 3 is a block diagram of an SSFM as implemented by some embodiments of impairment compensation logic 190. As noted above, virtual fiber link 210 includes multiple spans, and in this example there are M spans (220-1 . . . 220-M). Each virtual fiber span is divided into segments, and in this example there are $N_s$ segments 310-1 . . . 310-$N_s$. Each fiber segment 310 has length z, so the total propagation length for the entire virtual fiber link 210 is then $M \times N_s \times z$. Each step of the SSFM corresponds to one of these segments 310 within a span 220. Therefore, the terms segment and step can be used interchangeably in the context of an SSFM, and both are referred to with reference number 310.

Figure 4:
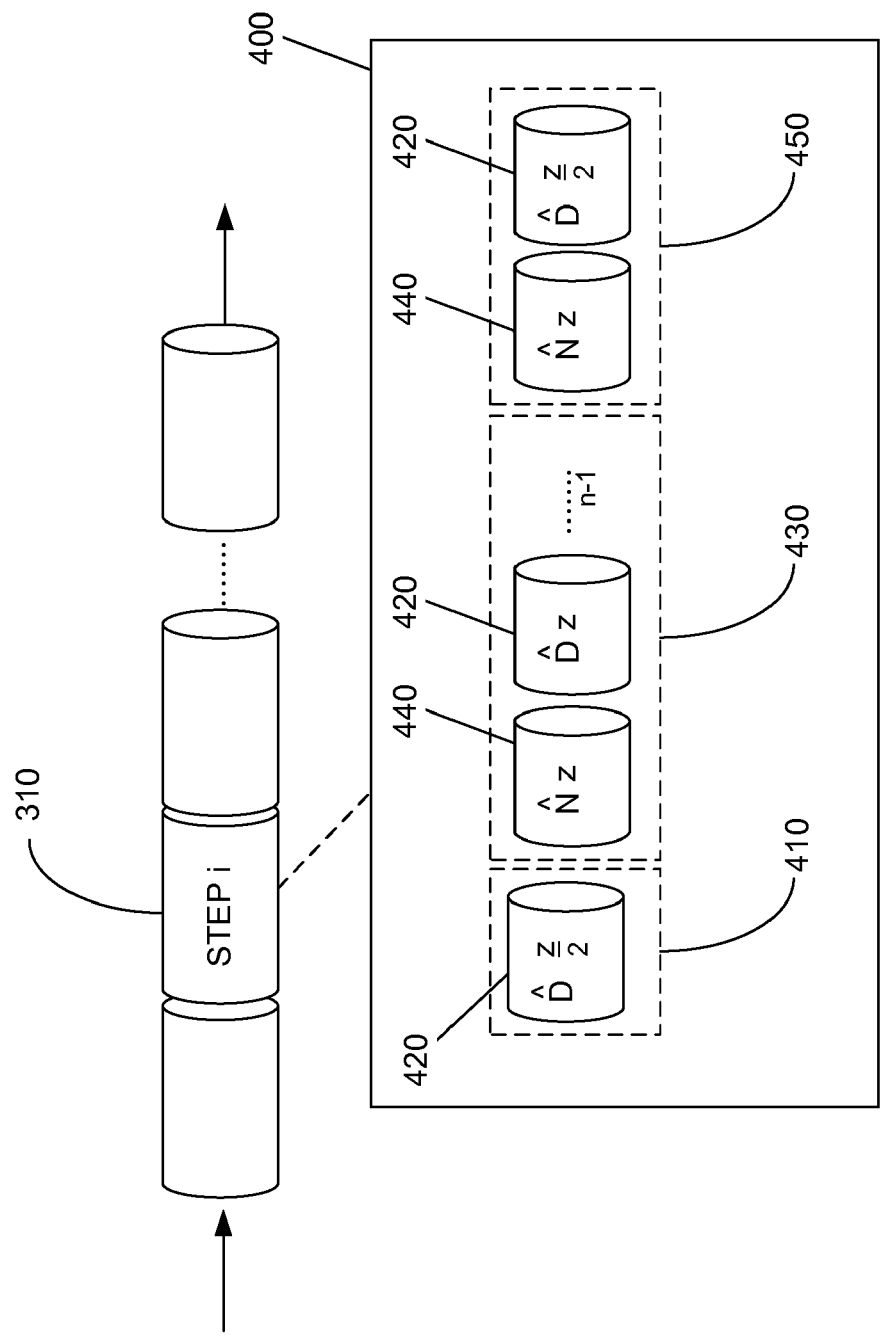
FIG. 4 is a block diagram of a single-step backward propagation module for performing compensation of a single step from FIG. 3, according to some embodiments.

FIG. 4 is a block diagram of a single-step backward propagation module 400 as implemented by some embodiments of impairment compensation logic 190 to perform compensation for a single segment or step (310). As described above, the NLSE uses a linear operator $\hat{D}$ to compensate for fiber dispersion and loss and a non-linear operator $\hat{N}$ to compensate for Kerr nonlinearity. Single-step backward propagation module 400 uses these operators in a specific series, and with a specific size parameter. A beginning block 410 of module 400 uses linear operator 420 and applies a half step size (z/2). A middle block 430 uses non-linear operator 440 and applies a full step size (z), followed by linear operator 420 with a full step size (z). This combination of operations is repeated N-1 times by middle block 430. An ending block 450 of module 400 completes compensation for the segment by applying a single instance of non-linear operator 440 with a full step size (z) followed by a single instance of linear operator 420 with a half step size (z/2).

Some embodiments of single-step backward propagation module 400 implement linear operator 420 in the frequency domain, using a Fast Fourier Transform (FFT), while others implement the operator in the time domain, using filters. Filtering may be more appropriate in real-time implementations since an FFT processes sequentially, in blocks. Similarly, finite impulse filtering may be more appropriate than infinite impulse filtering (IIR) since IIR uses a feedback path.

In a conventional FIR design, filter coefficients for a particular step are obtained by an inverse Fourier transform (IFT) of that step's dispersion frequency response (described by the $\hat{D}$ dispersion operator above). In such designs, the filter is typically truncated at the edges to keep the computational load low for a real-time implementation. This truncation results in the loss of the FIR filter's all-pass property: the requirement that the dispersion compensation filter's transfer function Hω should be lossless, i.e., $|H\omega|=1$, $\forall \omega$. Since the split step method uses multiple steps of dispersion compensation, the accumulated error from the truncation of the FIR filter becomes significant, ultimately resulting in deterioration of the received signal quality.

Instead of using IFT, some embodiments of single-step backward propagation module 400 implement linear operator 420 with a wavelet-based FIR filter design. Such embodiments use an interpolating function with compact support for the wavelet-based FIR filter. Compact support functions are only non-zero on a finite interval, as opposed to the harmonic basis on which the IFT FIR filter design is based. In some embodiments of wavelet-based linear operator 420, the Deslaurier-Duruc function ϕ(t) is used for the interpolating function. The function's support is determined by a single (odd) parameter, s, such that ϕ(t)≡0, $\forall |t|>s\Delta T$ where $\Delta T$ is the sampling interval. The interpolating function is defined by an FIR filter whose coefficients are given by:

$$h_{2k} = \delta_k \quad \text{(Eq. 4a)}$$

$$h_{2k+1} = h_{-2k-1} = \frac{(-1)^{\frac{s+1}{2}-k} \prod_{q=0}^{s}\left(q - \frac{s}{2}\right)}{\left(\frac{s-1}{2}-k\right)!\left(\frac{s+1}{2}+k\right)!\left(k+\frac{1}{2}\right)} \quad \text{(Eq. 4b)}$$

where ϕ(t) is the Kroneker delta function. The interpolating function's compact support dictates that $h_k \equiv 0$, $\forall |k|>s$.

Wavelet-based linear operator 420 involves finding the second order derivative of the time-shifted interpolation function $\phi_m(T)=\phi(T-T_m)$, where $T_m$ are the sampling instances. To achieve this, vectors $D^{(\mu)}$ of 2s-1 elements each are found by solving the linear set of equations defined by $$\sum_{k=-\frac{s+1}{2}}^{\frac{s+1}{2}} h_{2k+1}D_{2(k+n)+1} - 4D_n + D_{2n} = 0$$

with the normalization $$\sum_{n=1-s}^{s-1} n^2 D_n = 2.$$

The second and third order derivatives is found by solving the following set of equations:

$$\Sigma h_{2k+1}D_{2(k+n)+1}{}^{(\mu)} - 2^{-\mu}D_n{}^{(\mu)} + D_{2n}{}^{(\mu)} = 0 \quad \text{(Eq. 5a)}$$

$$\Sigma n^\mu D_n{}^{(\mu)} = \mu! \quad \text{(Eq. 5b)}$$

where n is an integer and Eq. 5b is used for normalization. The compact support limits the number of nonzero elements of D so that $D_n \equiv 0$, $\forall |n| \geq s$. From the symmetry of $\phi(t)$, D is also symmetric: $D_{-k} = D_k$, so that there are s equations required to obtain D.

Finally, the FIR filter used by wavelet-based linear operator 420 is given by $$\vec{h}_f = IFFT\left\{\exp\left\{FFT\left\{-j\frac{\beta_2}{2\Delta T^2}D\right\} \cdot z_{step}\right\}\right\}. \quad \text{(Eq. 6)}$$

In some embodiments, $\overrightarrow{D^{(2,3)}}$ are zero-padded (before the Fourier Transform) so that the impulse response is longer than the limit given by Eq. 6. In such embodiments, $\vec{h}_f$ is then truncated to reduce the number of operations, by setting all the coefficients that result in $\log(|\vec{h}_f|) < \epsilon$ to zero. In some embodiments, $\epsilon$ is scanned to obtain a value which provides good performance, while minimizing the number of non-zero coefficients.

Figure 5:
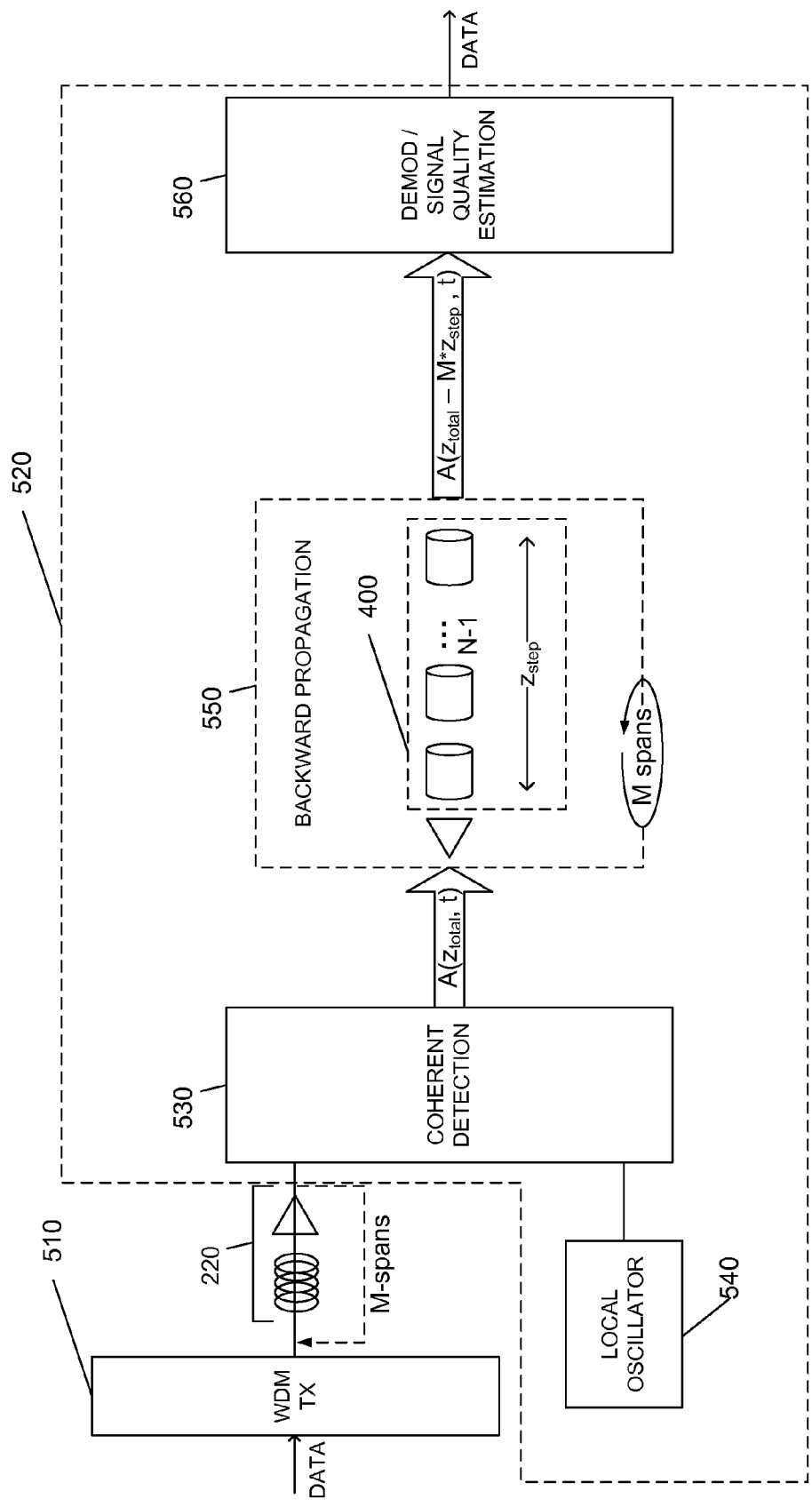
FIG. 5 is a block diagram of a wavelength division multiplexing (WDM) communication system utilizing the single-step backward propagation module from FIG. 4, according to some embodiments.

FIG. 5 is a block diagram of a wavelength division multiplexing (WDM) communication system utilizing an embodiment of single-step backward propagation module 400. Post-compensation is performed in the digital domain after coherent detection. A wave division multiplexed (WDM) transmitter 510 modulates incoming optical signals according to (electrical) data signals and performs wavelength-division multiplexing on the modulated optical signals. The WDM signal is transmitted over M (amplified) optical fiber spans 220. It should be appreciated that various technologies and mechanisms can be used for amplification and modulation.

A receiver 520 coupled to one of the fiber spans 220 receives the signal. A coherent detector 530, coupled to a local oscillator 540, processes the receive signal and outputs the complex electrical field of the signal, $A(z_{total}, t)$, where $z_{total}$ is the total length of the M spans. The complex form of the signal for each channel is provided to backward propagation module 550, which compensates for all M spans, using multiple instances of single-step backward propagation module 400, one for each span. It should be appreciated that FIGS. 4 and 5 are logical block diagrams. Thus, multiple physical instances of module 400 are not required, and the entire backward propagation module 550 can be implemented (for example) by a single processor, logic block, etc. The compensated signal produced by backward propagation module 550 is provided to demodulator 560. Some embodiments of demodulator 560 also perform signal quality estimation. The originally transmitted data is thus recovered by receiver 520.

Figure 6:
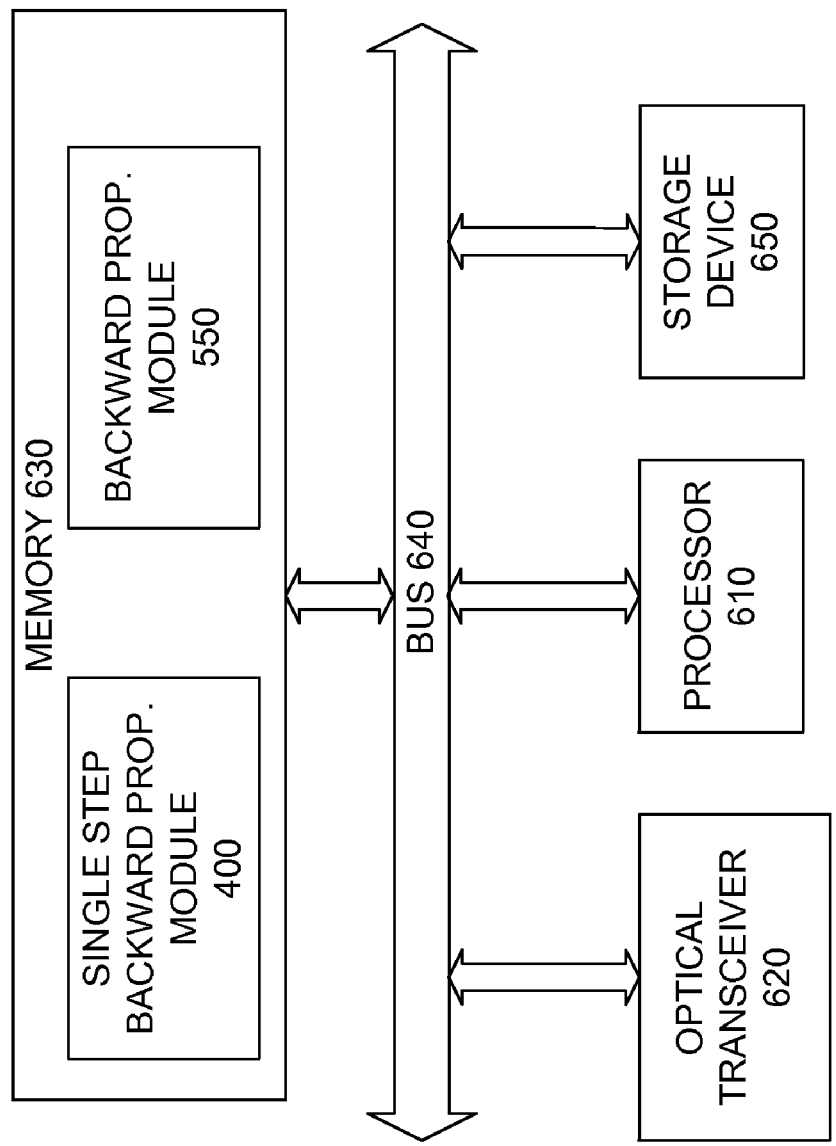
FIG. 6 is a hardware block diagram of an embodiment of the receiver from FIG. 5, according to some embodiments.

FIG. 6 is a hardware block diagram of an embodiment of receiver 520. Receiver 520 contains a number of components that are known in the electronics and computer arts, including a processor 610 (e.g., microprocessor, digital signal processor, microcontroller, digital signal controller), an optical transceiver 620, and memory 630. These components are coupled via a bus 640. Some embodiments also include a storage device 650, such as non-volatile memory or a disk drive. Omitted from FIG. 6 are a number of conventional components that are unnecessary to explain the operation of receiver 520.

In the embodiment of FIG. 6, single-step backward propagation module 400 and backward propagation module 550 reside in memory 630 as instructions which, when executed by processor 610, implement systems and methods of fiber impairment compensation as described herein.

In other embodiments (not shown), single-step backward propagation module 400 and backward propagation module 550 are implemented in hardware, including, but not limited to, a programmable logic device (PLD), a programmable gate array (PGA), a field programmable gate array (FPGA), an application-specific integrated circuit (ASIC), a system on chip (SoC), and a system in package (SiP).

Single-step backward propagation module 400, backward propagation module 550, or combinations thereof, can be embodied in any computer-readable medium for use by or in connection with a processor. In the context of this disclosure, a "computer-readable medium" can be any means that can contain or store the instructions for use by the processor. The computer readable medium can be, for example but not limited to, a system or that is based on electronic, magnetic, optical, electromagnetic, or semiconductor technology.

Specific examples of a computer-readable medium using electronic technology would include (but are not limited to) the following: random access memory (RAM); read-only memory (ROM); and erasable programmable read-only memory (EPROM or Flash memory). A specific example using magnetic technology includes (but is not limited to) a portable computer diskette. Specific examples using optical technology include (but are not limited to) compact disk (CD) and digital video disk (DVD).

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A method of compensating for transmission impairment over an optical transmission channel including an optical fiber and an optical amplifier, the method comprising:
   receiving an optical signal which has been distorted in the physical domain by an optical transmission channel;
   converting the optical signal to an electrical signal; and
   processing the electrical signal by solving, using a split-step Fourier Method (SSFM), a non-linear Schrödinger equation (NLSE) which describes a virtual optical fiber corresponding to the optical fiber, wherein the SSFM implements a linear operator with a wavelet-based FIR filter.

2. The method of claim 1, wherein the linear operator is implemented using the wavelet-based FIR filter and the wavelet-based FIR filter uses an interpolating function which has compact support for the wavelet-based FIR filter.

3. The method of claim 1, wherein the SSFM utilizes a non-linear operator.

4. The method of claim 3, wherein a single step of the SSFM includes a first instance of the linear operator which applies a half step size, followed by a first instance of the non-linear operator which applies a full step size, followed by a second instance of the linear operator which applies the full step size, followed by a second instance of the non-linear operator which applies the full step size, followed by a third instance of the linear operator which applies the half step size.

5. The method of claim 4, wherein the first instance of the non-linear operator and the second instance of the linear operator are repeated N−1 times in series, where N is a number of spans in the virtual optical fiber.

6. The method of claim 1, the NLSE using fiber parameters which are opposite in value to corresponding fiber parameters in the optical fiber.

7. The method of claim 1, wherein the received optical signal is a wavelength-division multiplexed signal.

8. A receiver comprising:
an optical detector configured to receive an optical signal which has been distorted in a physical domain by an optical transmission channel; and
a split-step Fourier Method (SSFM) solver configured to receive a distorted electrical signal, corresponding to the optical signal, from the optical detector and further configured to solve a non-linear Schrödinger equation (NLSE) which describes a virtual optical fiber corresponding to the optical fiber, the SSFM module comprising:
a plurality of single step modules, each comprising:
a first linear operator which applies a half step size;
a first non-linear operator, following the first linear operator, which applies a full step size;
a second linear operator, following the first non-linear operator, which applies the full step size; and
a second non-linear operator, following the second linear operator, which applies the full step size.

9. The receiver of claim 8, further comprising N−1 instances of the first instance of the non-linear operator and the second linear operator, the N−1 instances occurring in series, where N is a number of spans in the virtual optical fiber.

10. The receiver of claim 8, wherein at least one of the linear operators is implemented using a wavelet-based FIR filter.

11. The method of claim 8, the wavelet-based FIR filter uses an interpolating function which has compact support for the wavelet-based FIR filter.

12. The method of claim 1, the NLSE using fiber parameters which are opposite in value to corresponding fiber parameters in the optical fiber.

13. The method of claim 1, wherein the received optical signal is a wavelength-division multiplexed signal.

14. A receiver comprising:
memory containing instructions stored thereon;
a processor configured to execute the instructions;
an optical detector configured to receive an optical signal which has been distorted in the physical domain by an optical transmission channel and further configured to provide a corresponding distorted electrical signal to the processor,
wherein the processor is configured to:
solve, using a split-step Fourier Method (SSFM), a non-linear Schrödinger equation (NLSE) which describes a virtual optical fiber corresponding to the optical fiber,
wherein the SSFM implements a linear operator with a wavelet-based FIR filter.

15. The receiver of claim 14, wherein the wavelet-based FIR filter uses an interpolating function which has compact support for the wavelet-based FIR filter.

16. The receiver of claim 14, wherein the SSFM utilizes a non-linear operator.

17. The receiver of claim 16, wherein a single step of the SSFM includes a first instance of the linear operator which applies a half step size, followed by a first instance of the non-linear operator which applies a full step size, followed by a second instance of the linear operator which applies the full step size, followed by a second instance of the non-linear operator which applies the full step size, followed by a third instance of the linear operator which applies the half step size.

18. The receiver of claim 17, wherein the first instance of the non-linear operator and the second instance of the linear operator are repeated N−1 times in series, where N is a number of spans in the virtual optical fiber.

19. The receiver of claim 14, the NLSE using fiber parameters which are opposite in value to corresponding fiber parameters in the optical fiber.

20. The receiver of claim 14, wherein the received optical signal is a wavelength-division multiplexed signal.

* * * * *